Oct. 21, 1952 Z. KADLEC ET AL 2,614,825
PRECISION BALANCE
Filed Dec. 28, 1948 2 SHEETS—SHEET 2

Zdenek Kadlec
Eduard Dousa
INVENTORS

BY
ATTORNEY

Patented Oct. 21, 1952

2,614,825

UNITED STATES PATENT OFFICE 2,614,825

PRECISION BALANCE

Zdeněk Kadlec and Eduard Doůša, Prague, Czechoslovakia, assignors to Meopta, national corporation, Prerov, Czechoslovakia Application December 28, 1948, Serial No. 67,682
In Czechoslovakia January 23, 1948

2 Claims. (Cl. 265—54)

Our invention relates to precision balances and more particularly to laboratory inclination balances.

In hitherto known balances of that type the balance pan and the balance mechanism were housed in an at least practically undivided casing so that the very sensitive balance mechanism was exposed to unfavorable and often damaging influences from the outside caused for example by changes of temperature and of humidity of the surrounding atmosphere and by dust carried therewith whenever the balance casing was opened to place material on the balance pan or to remove such material therefrom. These influences from the outside naturally affected unfavorably the operation of the balance.

The main object of our invention is to avoid the said disadvantages. According to our invention the casing of the balance is composed of three hollow portions namely a lower and an upper horizontal arm and a connecting vertical arm which are arranged in C-shape. The lower horizontal arm forms the base of the casing, the upper horizontal arm houses particularly the balance beam and conventional weight indicating means, and the vertical arm houses the poises and their supporting and controlling means. The balance pan is mounted on a stirrup or other support attached to one end of the balance beam and extending into the free space between the said three arms forming the casing. This space is preferably enclosed by side walls to protect the balance pan at least one of said side walls being movable to permit access thereto.

The said and other objects of our invention will be more fully understood from the following specification when read with the accompanying drawing in which one embodiment of our new precision balance is illustrated.

In the drawing

Figure 1:
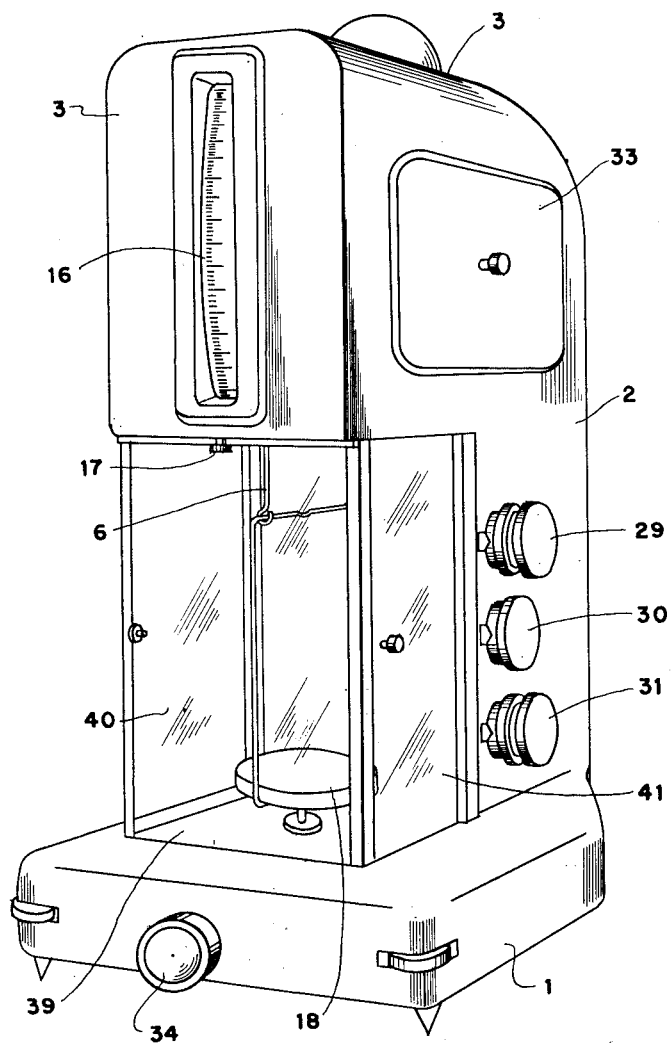
Fig. 1 is a perspective view of a precision balance including a casing according to our invention.
Figure 2:
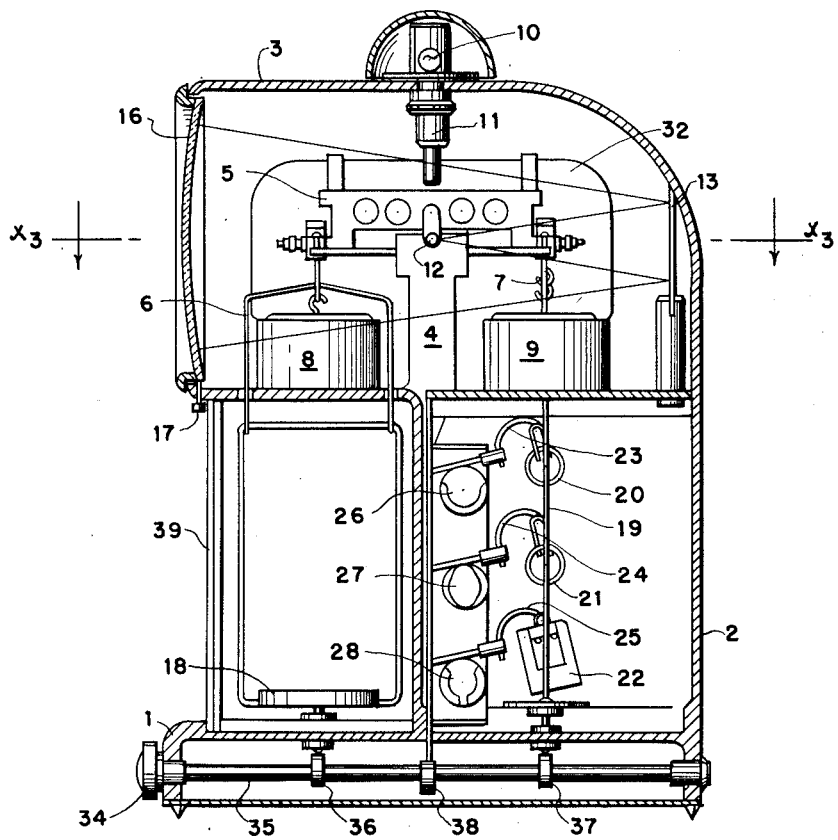
Fig. 2 is a vertical sectional view thereof.
Figure 3:
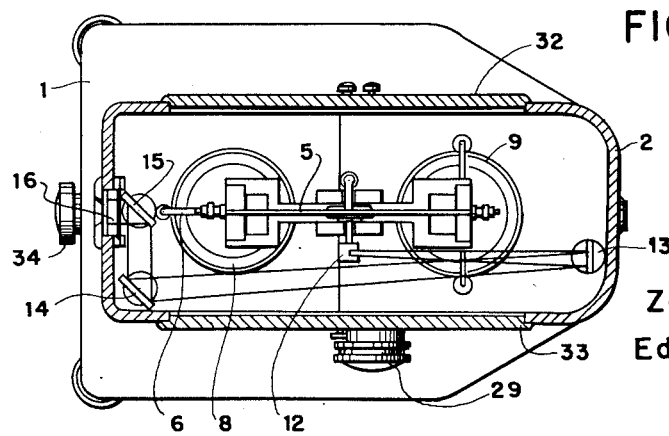
Fig. 3 is a horizontal cross section thereof along line $x_3$—$x_3$ in Fig. 2.

All parts of the balance are encased in an essentially C-shaped casing composed of a lower and an upper horizontal arm 1 and 3, respectively, and a connecting vertical arm 2. The lower arm 1 forms the base of the casing and the upper arm 3 houses the balance beam 5 which rests upon the support 4, and conventional weight indicating means which are optical in the shown embodiment. These means comprise an indicator scale upon a dull glass plate 16 arranged in the front wall of the arm 3 and an optical assembly composed of a light source 10, a lens, condenser and indicator mark within a tube 11, a mirror 12 attached to and swinging with the beam 5 and a system of reflecting mirrors 13, 14, 15 which reflect the light beam emanating from the light source 10 upon said indicating scale on the glass plate 16. The position of this glass plate 16 may be adjusted by a setting screw 17. The arm 3 houses also conventional damping means 8, 9 attached to said balance beam 5 and is provided with removable covers 32, 33 to permit easy access to the balance mechanism housed therein if and when required.

The balance pan 18 is suspended from one arm of the beam 5 by the stirrup or other conventional support 6 and is situated within the free space formed by the arms 1, 2, 3 of the casing. This space is enclosed by removable for example slidable side walls 40, 41 and by the fixed front wall 39. These walls 39, 40, 41 are preferably made from transparent material such as glass.

The other arm of the beam 5 is provided with a hook 7 which supports another stirrup or similar member 19 for the poises 20, 21, 22 which are housed within the vertical arm 2 of the casing. These poises are mounted upon holders 23, 24, 25 respectively, each of which is controlled by one of the cams 26, 27, 28 actuated by their respective knobs 29, 30, 31 arranged on the side wall of the arm 2.

The arresting device for the balance mechanism consists of cams 36, 37, 38 which are mounted within the lower casing arm 1 upon the shaft 35 operable by the knob 34 and which engage against the pan 18, the stirrup 19 and the balance beam 5, respectively.

Having shown and described one embodiment of our invention to illustrate the principles thereof it will be well understood that the same may be constructed in various other embodiments which come within the scope of the appended claims.

What we claim as our invention is:

1. In a precision balance, more particularly laboratory inclination balance, the combination of a balance beam, a balance pan, poises, supporting means for said pan and said poises, weight indicating means, and an essentially C-shaped casing with a lower and an upper horizontally extending arm and a vertical connecting arm therebetween, the lower horizontal arm forming the base for the balance casing, the upper horizontal arm housing the balance beam and the weight indicating means, the vertical connecting arm housing the poises and their supporting means, the balance pan being arranged within the free space between the said three arms forming the C-shaped balance casing.

2. In a precision balance, more particularly laboratory inclination balance, the combination of a balance beam, a balance pan, poises, supporting means for said pan and said poises, weight indicating means, an essentially C-shaped casing with a lower and an upper horizontally extending arm and a vertical connecting arm therebetween, the lower horizontal arm forming the base for the balance casing, the upper horizontal arm housing the balance beam and the weight indicating means, the vertical connecting arm housing the poises and their supporting means, the balance pan being arranged within the free space between the said three arms forming the C-shaped balance casing, and side walls attached to the said arms and enclosing said free space therebetween, at least one of said side walls being movable.

ZDENĚK KADLEC.
EDUARD DOUŠA.

REFERENCES CITED

The following references are of record in the file of this patent:

UNITED STATES PATENTS

| Number | Name | Date |
| --- | --- | --- |
| 1,151,788 | Holz | Aug. 31, 1915 |
| 1,562,936 | Ainsworth | Nov. 24, 1925 |
| 2,059,742 | Petri | Nov. 3, 1936 |
| 2,279,706 | Hem | Apr. 14, 1942 |
| 2,316,947 | Flanagan | Apr. 20, 1943 |